(12) United States Patent
Ghatta et al.

(10) Patent No.: US 6,479,562 B2
(45) Date of Patent: Nov. 12, 2002

(54) BLOW-MOLDED FOAMED FILMS OF POLYESTER RESIN

(75) Inventors: Hussein Al Ghatta, Fiuggi; Tonino Severini, Colleferro, both of (IT)

(73) Assignee: Sinco Ricerche S.p.A., Verbania Pallanza (IT)

( * ) Notice: Subject to any disclaimer, the term of this patent is extended or adjusted under 35 U.S.C. 154(b) by 0 days.

(21) Appl. No.: 09/791,689

(22) Filed: Feb. 26, 2001

(65) Prior Publication Data

US 2001/0020046 A1 Sep. 6, 2001

(30) Foreign Application Priority Data

Mar. 2, 2000 (IT) .......................... MI2A00417

(51) Int. Cl.$^7$ .............................. C08J 9/12; B29D 7/00
(52) U.S. Cl. ..................... 521/182; 264/45.9; 264/514
(58) Field of Search ................................ 521/138, 182, 521/79, 81; 264/45.9, 514

(56) References Cited

U.S. PATENT DOCUMENTS

| | | | | |
|---|---|---|---|---|
| 4,145,466 A | * | 3/1979 | Leslie et al. | 264/523 |
| 5,321,052 A | | 6/1994 | Toshio et al. | |
| 5,340,846 A | * | 8/1994 | Rotter et al. | 521/138 |
| 6,100,307 A | * | 8/2000 | Tung et al. | 621/138 |

OTHER PUBLICATIONS

Database WPI, Section Ch, Week 198742 Derwent Publications Ltd., London, GB; AN 1987–294367, XP002171781, & JP 62 204924 A (Toyo Seikan Kaisha Ltd), Sep. 9, 1987 *abstract*.

* cited by examiner

Primary Examiner—Morton Foelak
(74) Attorney, Agent, or Firm—Guido Modiano; Albert Josif; Daniel O'Byrne

(57) ABSTRACT

A blown foamed film of polyester resin, obtained by blow-molding a foamed tubular sheet at the outlet of a foaming extruder.

7 Claims, No Drawings

BLOW-MOLDED FOAMED FILMS OF POLYESTER RESIN

The present invention relates to blow-molded foamed films of polyester resin and to the method for producing them.

BACKGROUND OF THE INVENTION

Polyester resin films, particularly biaxially-stretched ones, are widely used in various technological fields by virtue of their high-level properties in mechanical and electrical terms as well as in terms of resistance to chemicals.

Biaxially-stretched films are superior to other films both in their tensile properties, particularly their high elastic modulus, and in their dimensional stability.

However, the films have drawbacks, mainly due to their high relative density and to the lack of opacity, which for some applications, for example in the field of computer technology and photography, require the films to be rendered opaque by using large amounts of white pigments.

Foamed mono- or biaxially-stretched films of polyester resin allow to solve the problems of non-foamed films and at the same time allow to have entirely new properties with respect to non-foamed films, such as for example high impact strength and considerable heat-shrinking.

Mono- and biaxially-stretched foamed films of polyester resin are disclosed in a previous patent application in the name of the Applicant (European application 991220468).

The films are prepared by extruding, under foaming conditions (extrusion-foaming), a polyester resin having Theological characteristics suitable for forming foamed cellular products, and by then subjecting the foamed sheets or films to mono- or biaxial stretching, using stretch ratios which can be as high as 5:1.

BRIEF DESCRIPTION OF THE INVENTION

It has now been found unexpectedly that it is possible to obtain, from polyester resins having specific Theological characteristics which are suitable for forming foamed materials, blown foamed films (not orientated or biaxially orientated) by blow-molding a foamed tubular sheet of polyester resin at the outlet of the foaming extruder, using the single- or double-bubble method and so as to respectively obtain stretched films which are substantially not orientated, and biaxially orientated stretched films.

DETAILED DESCRIPTION OF THE INVENTION

The polyester resin suitable for the process according to the invention has a melt viscosity of more than 2000 Pa.s at 280° C. with a shear rate which tends to zero and a melt strength of more than 10 cN at 280° C.

Preferred melt viscosity values are between 5000 and 20000 Pa.s; the melt viscosity is preferably higher than 50 cN and can reach 150 cN or more.

Intrinsic viscosity is generally between 0.8 and 1.5 dl/g.

Polyester resins having the above indicated Theological properties are preferably obtainable by solid-state polycondensation (SSP) of a polyester resin which has an intrinsic viscosity generally lower than 0.7–0.8 dl/g, with the addition of a dianhydride of a tetracarboxylic aromatic acid, representatively pyromellitic dianhydride, in amounts from 0.05 to 2% by weight, working under temperature conditions (generally between 80 and 220° C.) and with durations which bring the melt strength and melt viscosity to the intended values.

The solid-state polycondensation is performed according to known methods, such as for example the method described in U.S. Pat. No. 5,243,000, whose description is hereby incorporated by reference.

Other suitable methods are described in U.S. Pat. Nos. 5,288,764 and 5,229,432, whose description also is incorporated herein by reference.

The starting polyester resins that can be used to obtain the above described Theological properties are prepared by polycondensation, according to known methods, of dicarboxylic aromatic acids with diols with 2–12 carbon atoms or by transesterification of lower alkyl esters of dicarboxylic acids with diols with 2–12 carbon atoms and subsequent polycondensation of the diol esters.

Preferred aromatic acids are terephthalic acid, isophthalic acid and naphthalene dicarboxylic acids.

Preferred resins are polyethylene terephthalate and its copolymers in which from 1 to 20–25, preferably 2–15, units derived from terephthalic acid are replaced with units derived from isophthalic and/or naphthalene dicarboxylic acids.

The polyester resins can be used in mixture with other resins, particularly polyamides, used in amount from 2 to 50% by weight on the polyester resin.

A polyamide which is particularly suitable especially to give improved gas barrier properties (against oxygen and $CO_2$) is poly-m.xylylidene adipamide.

This polyamide is mixed in the molten state with the polyester resin, which is premixed, likewise in the molten state, with a dianhydride of a tetracarboxylic aromatic acid, preferably pyromellitic dianhydride, in an amount from 0.05 to 2% by weight on the polyester resin.

The addition of the polyamide resin (which can be aliphatic or aromatic, with high or low average molecular weight) also allows to considerably reduce the content of unreacted dianhydride in the foamed film.

Other resins which can be added to the aromatic polyester resin are aliphatic polyester resins obtainable from aliphatic dicarboxylic acids with 4–22 carbon atoms, such as adipic acid, and from aliphatic diols with 2–22 carbon atoms, or from aliphatic hydroxy-acids or from the corresponding lactones or lactides.

Poly-epsilon-caprolactone is one of the preferred resins.

The aliphatic polyester resins (which are highly biodegradable) are added in order to give the aromatic polyester resin biodegradability or biocompostability characteristics.

The foamed tubular sheet suitable for preparing the blown films is extruded from annular heads with a slit generally between 0.1 and 0.5 mm.

The amount of foaming agent (nitrogen, carbon dioxide or liquid hydrocarbons or other agents) is such as to allow to obtain apparent densities of the non-blow-molded foamed sheet between approximately 50 and 700 $kg/m^3$.

The extrusion-foaming process for forming the foamed sheet is performed according to known methods.

Similarly, the blow-molding of the tubular sheet is performed according to known methods, using the single- or double-bubble method depending on whether one wishes to produce non-oriented or bi-oriented blow-molded films.

The tensile properties of the bi-oriented blow-molded films are far superior to those of non-oriented films.

A common characteristic of both film types is their great heat-shrinkage, which makes them particularly suitable for applications such as labeling and packaging of palletized units.

Another characteristic which is particularly evident in the bi-oriented films is their high birefringence, which makes them particularly suitable for olographic printing and similar applications.

The good bonding of inks of blow-molded films makes them particularly suitable in applications as paper replacement.

The biocompostability of the films when they are prepared from compositions comprising a biodegradable aliphatic polyester, to which starch can optionally be added, makes them suitable for producing compostable bags for waste collection.

In preparing the film, the ratio between the extrusion rate of the tubular sheet and the winding rate of the blow-molded film is higher than 1 and is generally between 2 and 8; the ratio between the diameter of the extrusion head and the diameter of the bubble is greater than 2 and is generally between 4 and 6.

The density of the blow-molded films is generally from 0.05 to 0.5 $cm^3$.

The thickness of the films is generally from 10 to 100 microns.

Measurement Methods

Intrinsic viscosity was measured in a 60/40 by weight solution of phenol and tetrachloroethane at 25° C. according to ASTM D 4603-86.

Rheological measurements were made according to the ASTM D 3835, using a Goettfert rheometer at 280° C.

Melt strength was determined by measuring the force in cN (centinewtons) required to stretch the material extruded from the capillary of a Goettfert Rheograph 2002 rheometer.

For measurement, a Rheotens unit was applied at the outlet of the capillary of a Goettfert Rheograph 2002 rheometer.

The extrusion conditions are as follows:

plunger speed: 0.2 mm/sec die diameter: 2 mm capillary length: 30 mm test temperature: 280° C.

Measurements are performed by setting an acceleration of 2.4 $cm/sec^2$.

Each measurement is repeated and the average of the two measurements taken.

EXAMPLE 1

80 kg/h of polyethylene terephthalate copolymer material, containing 2% by weight of isophthalic acid, with a melt strength of 150 cN at 280° C., melt viscosity of 1800 Pa.s measured at 300° C. with a shear rate of 10 rad/sec and intrinsic viscosity of 1.25 dl/g, obtained by regrading the polymer in the solid state at a temperature of 210° C. in the presence of 0.4% by weight of pyromellitic dianhydride, were fed continuously, after drying at 140° C. for 10 hours, in a co-rotating double-screw extruder having a screw diameter of 90 mm.

Downstream of the screws there was a static mixer in order to improve homogenization of the various components of the mixture.

The temperatures set on the extruder were 280° C. in the melting section, 280° C. in the mixing section, 270° C. in the cooling section and 265° C. on the extrusion head.

The screws turned at 30 rpm.

1% by weight of nitrogen (foaming agent) was added to the PET in the section of the extruder located after the melting of the polymer and thoroughly mixed with the polymeric matrix.

The PET/nitrogen composition, once mixed, was extruded through an annular head with a circumference of 70 mm and a slit of 0.3 mm.

The mixture of molten polymer containing the foaming agent was forced through the extrusion head at a pressure of approximately 70 bar.

The tubular sheet exiting the extrusion head was blow-molded with air at 23° C.

The resulting film in bubble form was processed in a vertical position and, after cooling, was closed onto a collapsing frame by means of two compression rollers and then wound in bobbins.

The operating conditions of the test and the results were as follows:

extruder temperature: 280° C. on the screws and in the mixing section; 270° C. in the cooling section; 260° C. on the extrusion head;

extruder screw rotation rate: 30 rpm;

polymer flow-rate: 80 kg/h;

type of foaming agent: nitrogen;

amount of foaming agent: 1% by weight on the polymer;

extrusion pressure measured on the head: 71 bar;

RO/RL expansion ratio: 5;

VL/VO stretch ratio: 6;

(where VL=extrusion rate; VO=winding rate; RL=extrusion head diameter; RO=bubble diameter).

final thickness: 110 μm;

cell size: >200 microns.

The blow-molded film had the following impact-resistance properties:

breaking force referred to the beginning of fracture: 10 N total breaking energy referred to the end of fracture propagation: 0.01 J/mm.

EXAMPLE 2

Example 1 was repeated, with the only difference that the annular extrusion head for the polymer/nitrogen mixture had a diameter of 50 mm and a slit of 0.21 mm and the pressure with which the molten mixture was forced through the annular head was 68 bar.

The operating conditions of the test were as follows:

extruder temperature: 280° C. on the screws and in the mixing section; 270° C. in the cooling and mixing section; 260° C. on the extrusion head;

extruder screw rotation rate: 60 rpm;

polymer flow-rate: 60 kg/h;

type of foaming agent: nitrogen;

amount of foaming agent: 1% by weight on the polymer;

extrusion pressure measured on the head: 69 bar;

RO/RL expansion ratio: 5;

VL/VO stretch ratio: 6;

final thickness: 90 μm;

cell size: >200 microns.

The disclosures in Italian Patent Application No. MI2000A000417 from which this application claims priority are incorporated herein by reference.

What is claimed is:

1. A blown foamed film obtained by blowing an extruded foamed tubular sheet at the outlet of an extruder, an aromatic polyester resin forming the foamed sheet having a melt strength higher tan 10 cN at 280° C.

2. The film according to claim 1, wherein the melt viscosity and the melt strength of the polyester resin are higher than 2000 Pa.s at 280° C., with a shear force which tends to zero, and 10 cN at 280° C., respectively.

3. The film according to claim 1, wherein the melt viscosity is from 5000 to 20000 Pa.s and the melt strength is higher than 50 cN.

4. The film according to claim 1, wherein the thickness of the film is from 10 to 100 μm and the density is from 0.05 to 0.5 g/cm$^3$.

5. The film according to claim 1, obtained using the single-bubble blow molding technique.

6. The film according to claim 1, obtained using the double-bubble blow molding technique.

7. The film according to claim 1, wherein the polyester resin is selected from the group consisting of polyethylene terephthalate and polyethylene terephthaliate copolymers, in which 1 to 20% of monomeric units derived from terephthalic acid are replaced with units derived from isophthalic acid and/or naphthalene dicarboxylic acids.

* * * * *